(12) United States Patent
Brooks

(10) Patent No.: US 8,049,443 B2
(45) Date of Patent: Nov. 1, 2011

(54) LINE VOLTAGE INTERFACE FOR AUTOMATION SYSTEMS

(75) Inventor: Paul Brooks, Chualar, CA (US)

(73) Assignee: AgroLinks, LLC, Chualar, CA (US)

( * ) Notice: Subject to any disclaimer, the term of this patent is extended or adjusted under 35 U.S.C. 154(b) by 424 days.

(21) Appl. No.: 12/277,123

(22) Filed: Nov. 24, 2008

(65) Prior Publication Data

US 2009/0284073 A1   Nov. 19, 2009

Related U.S. Application Data

(63) Continuation-in-part of application No. 12/122,464, filed on May 16, 2008, now abandoned.

(51) Int. Cl.
*H02P 7/00* (2006.01)
(52) U.S. Cl. .................. 318/257; 318/255; 318/256
(58) Field of Classification Search .................. 318/255, 318/256, 257; 307/38
See application file for complete search history.

(56) References Cited

U.S. PATENT DOCUMENTS

| | | | | |
|---|---|---|---|---|
| 5,548,198 A | * | 8/1996 | Backstrand | 318/799 |
| 5,742,624 A | * | 4/1998 | Irie et al. | 714/799 |
| 6,392,373 B1 | * | 5/2002 | Glasgow et al. | 318/430 |
| 6,392,557 B1 | * | 5/2002 | Kreuter | 307/112 |

* cited by examiner

*Primary Examiner* — Walter Benson
*Assistant Examiner* — David Luo
(74) *Attorney, Agent, or Firm* — LaRiviere, Grubman & Payne, LLP

(57) ABSTRACT

An integrated printed circuit board-based solid state line voltage interface for use in automation control system applications. Relays connect various functional loads to the line level source in response to input from a controller unit. Switches enable a user to override the controller and manually control the connection of the functional loads. An alternative embodiment further includes limit switches and time delays. The compact nature of the device facilitates ease of installation, mounting of multiple units in less space, and mounting in various specialized location as desired.

11 Claims, 3 Drawing Sheets

LINE VOLTAGE INTERFACE FOR AUTOMATION SYSTEMS

PRIORITY CLAIM

This application is a continuation in part of application Ser. No. 12/122,464, entitled "Line Voltage Interface for Automation Systems" filed on May 16, 2008 now abandoned, and claims priority thereto.

TECHNICAL FIELD

The present invention relates to the field of automation systems. More specifically, the invention relates to the interface between automation control units, power sources, and multifunction loads, such as, for instance, variable speed and/or reversible motors.

BACKGROUND ART

Automation systems employ controller devices such as microprocessors, computers, and programmable logic controllers (PLC's), to control machinery, equipment, and processes. These systems may control various equipment including fans, dampers, valves, vents, shades, and other equipment. Often, automation controller units read a set of digital and/or analog inputs, apply a set of logic statements, and in response generate a set of low or very low voltage analog and/or digital output signals. These output signals are then often transferred from the automation control system to either additional low voltage interface relays or pilot relays, which are operative of final power relays. Power relays then engage the relevant line voltage loads, resulting in, for instance, an electrical motor performing a function that corresponds to the instruction originating from the automation control unit. These existing low voltage pilot relays or interface devices may or may not have integral override switches, but are not capable of transferring the full motor load.

Automation interfacing of reversing or multi-speed motors also requires additional relays, wiring, and override switches, all of which are usually custom-built from individual electrical components. The sheer volume of components required often necessitates that large or multiple electrical boxes be utilized. Such a bulky arrangement can prohibit mounting of the equipment in tight or compact spaces. Additionally, in some situations it may be desirable to locate the reversing motor interface so as to facilitate the electrical installations (e.g. locating the interface next to the controller versus next to motor). The complicated and non-compact manner in which present art relay/switch systems are built for automation interfacing inhibits the ability to locate components and wiring in the most cost-effective, compact, and desirable configuration.

Therefore, there is a need for an integrated device to act as an interface between automation control units, multifunction load devices, including, for instance, reversing or multi-speed motor applications, and the power sources that drive those loads. Such an integrated device would incorporate relays and switches in a single, compact, easily installed interface; the use of which would require minimal electrical knowledge on the part of the user, including an owner and/or installer. Such a device would facilitate automatic control of the line voltage load by a controller unit, while also providing a means for manual override (including means for the user to select individual functions), powering the system off, and control for special situations.

DISCLOSURE OF THE INVENTION

The present invention pertains to integrated line voltage interface means and devices for use in automation control system applications. In an embodiment of the inventive concept, an interface device acts as a junction between an automation controller unit, a power source, and a multifunction load. In a preferred embodiment, an interface device is comprised of: (1) one or more terminal blocks having an array of terminals as set forth below; (2) an array of function input terminals for receiving signals from an automation control unit; (3) an array of alternative load terminals (each associated with a function input terminal); (4) a power path circuit for selectably connecting a power source input terminal to each alternative load terminal; and (5) a control circuit coupling each function input terminal to a corresponding responsive relay that, when energized, selects a power path connecting the power source input terminal to the associated load terminal. Embodiments may also include indicator lights, such as light emitting diodes or functional equivalents, coupled with each function input terminal.

In a preferred embodiment, the interface may also comprise a three way mode selection switch whereby a user, meaning a owner, operator and/or installer, can set the device to: (1) "auto" mode, whereby the power path connecting the function loads is controlled by the automation controller unit, or (2) "manual" mode, whereby the user can manually select the power path between the power source input and the various alternative load terminals by means of a second function selection switch, or (3) "off" position, effectively breaking the power path and disconnecting the power source input terminal from all load terminals. Said embodiment further comprises a second function selection switch, interposed between the load terminals and the power source input and connected to the mode selection switch, enabling manual selection of the power path from the power source input terminal to any of the alternative load terminals. In a preferred embodiment each circuit is embodied in a solid state, printed circuit board assembly; however, alternative embodiments can be comprised of any functionally appropriate construction means.

Another alternative embodiment of the present inventive concept may also include terminals for the connection of limit switches for preventing excessive travel in applications having directional limits (i.e. where the load is an electrical motor driving a mechanical function with a defined range of motion). A further alternative embodiment may also include time delay devices interposed in the control circuit for time dependent connection of each load. As an example, this feature could be useful in applications involving a reversing motor where the motor requires a predetermined window of time to wind down before changing direction.

Various embodiments wherein interface elements are contained within a compact self-contained device offer significant advantages over prior art methods of installation. A compact interface device is simpler to install and to operate, facilitates mounting of multiple units in the same space, is more easily mounted in various locations as desired, and offers the versatility of portability and use in multiple situations over time.

BEST MODES FOR CARRYING OUT THE INVENTION

Embodiments of the present inventive concept are drawn to an integrated interface for use in automation control applications replacing separate relays, switches and their associated wiring with a compact integrated device that is easy to install.

Figure 1:
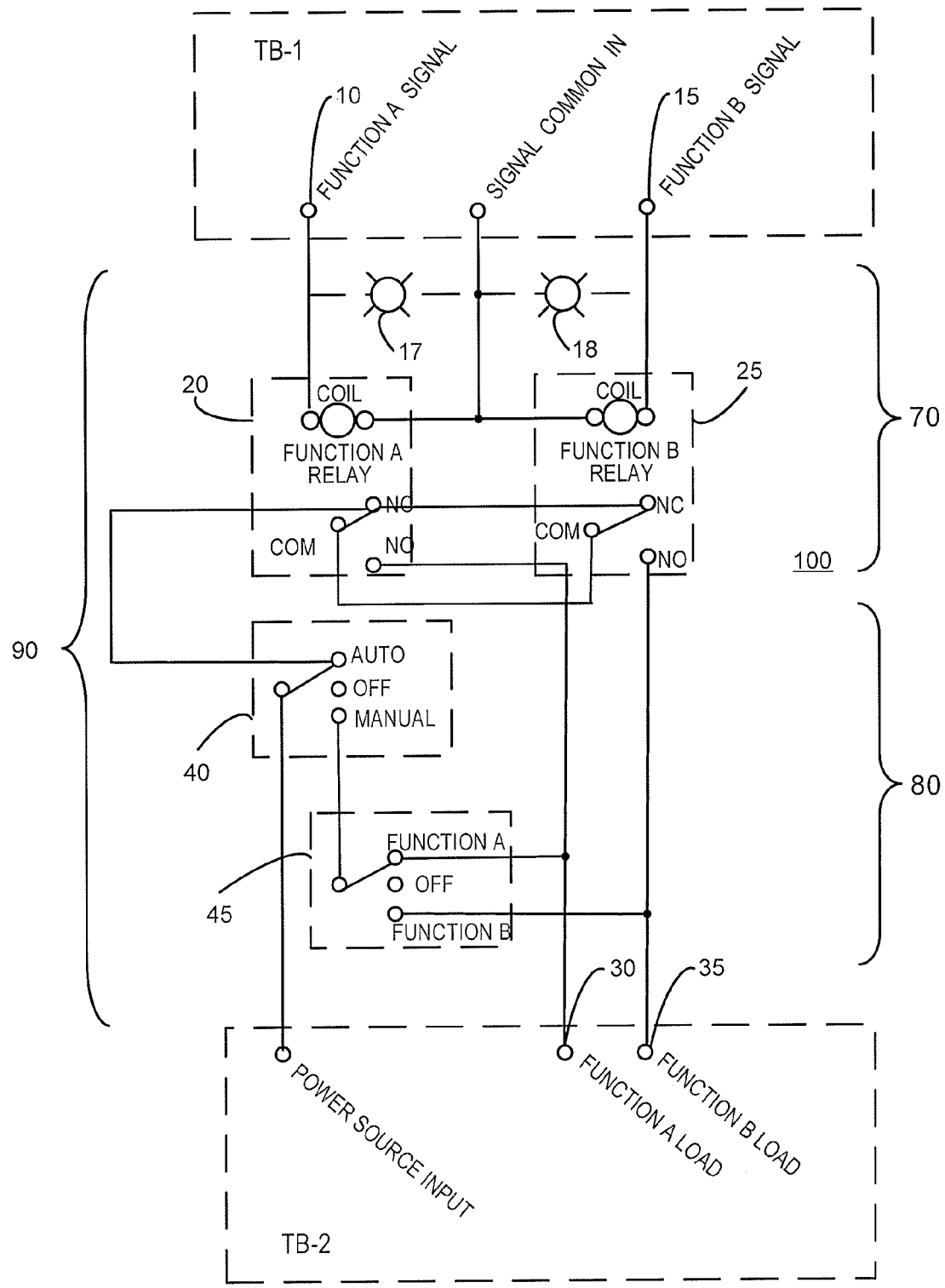
FIG. 1 is a circuit diagram of an interface in accordance with an embodiment of the present invention.

FIG. 1 illustrates interconnected circuits, interface 100, interrelating an automation controller unit, a power source, and two functional loads. Power controller 90 of interface 100 comprises control circuit 70 and power path circuit 80. Control circuit 70 receives function A and B signals at function input terminals 10 and 15 from an automation controller unit (not shown) and controls power path circuit 80 by means of relays 20 and 25. Power path circuit 80 selectably connects the power source input terminal to load terminals 20 and 25. Signals A and B correspond to the two functions of a dual function load; for instance, the low speed and high speed of a two-speed motor, which may effect such operations as the cooling stages of a climate controlled building. Other possible dual functions, such as forward and reverse, are apparent to one skilled in the art. Each function input terminal is associated with a load terminal (i.e., function A with load terminal 30, function B with load terminal 35).

Relays present in control circuit 70 are arranged such that both relays 20 and 25 have their normally closed poles connected, and are fed line voltage. The common poles of relays 20 and 25 are connected. Relay 20 is associated with function A, while relay 25 is associated with function B. In this regard, the normally open pole of relay 20 is circuited to control connection of corresponding load terminal 30 to the power source input. Similarly, relay 25 controls the connection of load terminal 35 to the power source input. When no signal is present, relays 20 and 25 are normally closed, thus preventing either load terminal 30 or 35 from connecting to the power source input by way of power path 80.

When a function A signal is received at function input terminal 10 (with no function B signal present), indicator 17 activates, relay 20 is energized, and load terminal 30 is connected to the power path circuit. In an identical manner, when a function B signal is received at function input terminal 15 (with no function A signal present), indicator 18 activates, relay 25 is energized and load terminal 35 is connected to the power path circuit. In the event that control circuit 70 receives concurrent signals at function input terminals 10 and 15, both relays 20 and 25 are energized and change to the open state, which causes the load terminals 30 and 35 to connect to each other, with no connection of either load terminal to power path circuit 80. This prevents damage that might otherwise occur as a result of receiving simultaneous and conflicting signals.

Mode selection switch 40 affects the controlling input for control circuit 70. When switch 40 is in the "auto" position, the automation controller unit determines by means of control circuit 70 the connection of load terminals 30 and 35 to the power source input by means of power path circuit 80. When switch 40 is in the "off" position, no connection of the load terminals to power path circuit 80 is possible. Conversely, when switch 40 is in the "manual" position, connection of the load terminals to power path circuit 80 is determined by the position of function selection switch 45.

Switch 45 has positions for connecting the load terminals 30 or 35 to the power source input, as well as an "off" position. Together, switches 40 and 45 enable a user to override the automation controller unit and to select manually the connection of power path circuit 80 to the load terminals. Because switches 40 and 45 are directly interposed in power path circuit 80, this configuration allows a user to switch between the various functions associated with each load terminal, and is especially useful in the event the controller unit becomes inoperative.

Figure 2:
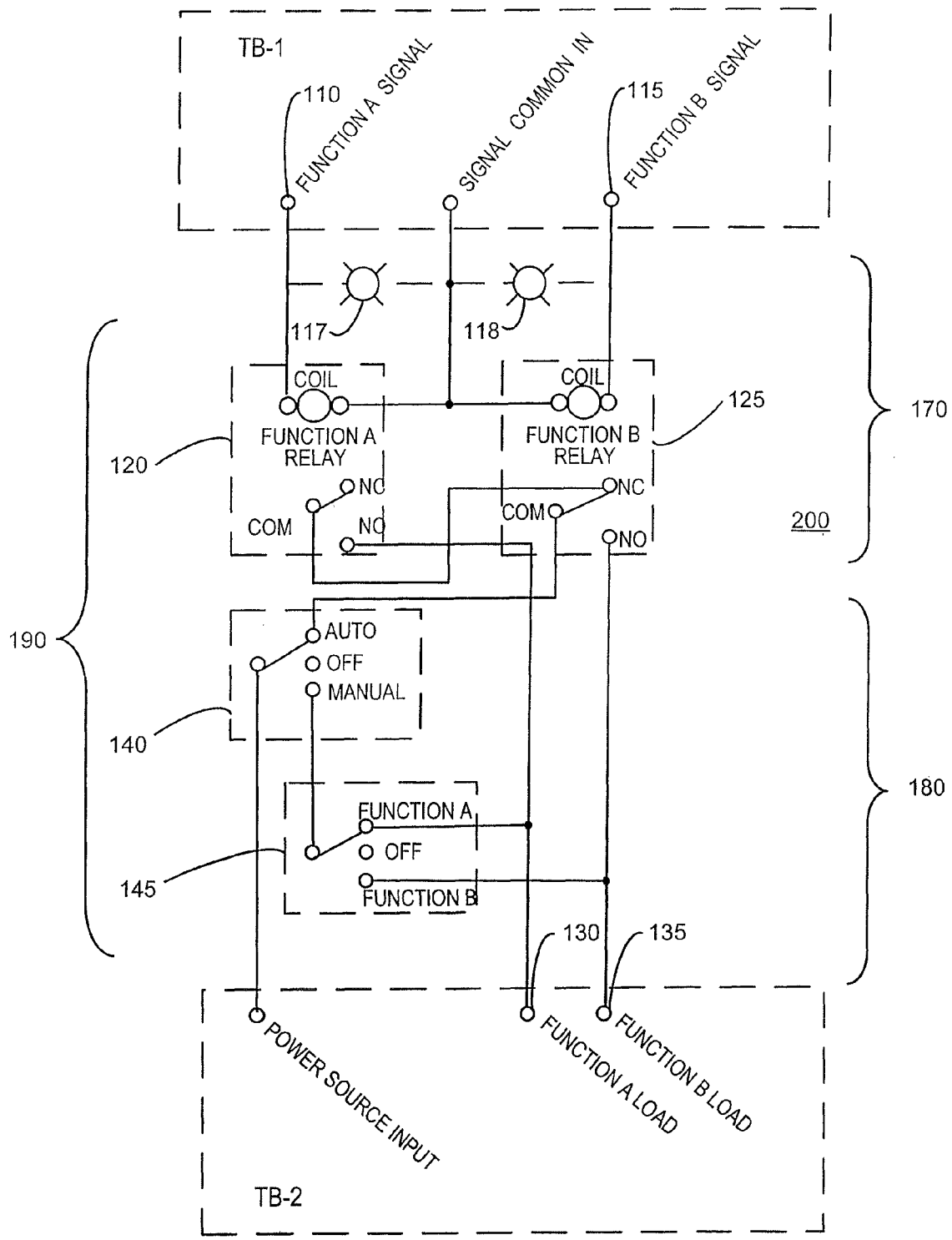
FIG. 2 is a circuit diagram of an interface in accordance with an alternative embodiment of the present invention.

FIG. 2 illustrates similar interconnected circuits, interface 200, for interrelating an automation controller unit, a power source, and two functional loads, in accordance with an alternative preferred embodiment of the present invention. Power controller 190 of interface 200 comprises control circuit 170 and power path circuit 180. Again, control circuit 170 receives function A and B signals at function input terminals 110 and 115 from an automation controller unit (not shown) and controls power path circuit 180 by means of relays 120 and 125. Power path circuit 180 selectably connects the power source input terminal to load terminals 120 and 125. As in the previous embodiment, these signals correspond to the two functions of a dual function load; each function input terminal being associated with a load terminal (i.e., function A with load terminal 130, function B with load terminal 135). Relays 120 and 125 are associated with functions A and B, respectively.

Relays present in control circuit 170 are arranged such that the common pole of relay 125 is fed line voltage, while the normally closed pole of relay 125 is connected to the common pole of relay 120. The normally open pole of relay 120 is connected to load terminal 130 while the normally open pole of relay 125 is connected to load terminal 135. When no signal is present, relays 120 and 125 are normally closed. When a function A signal is received at function input terminal 110 (with no function B signal present), indicator 117 activates, relay 120 is energized and connects power path circuit 180 to load terminal 130. Likewise, when a function B signal is received at function input terminal 115 (with no function A signal present), indicator 118 activates, relay 125 is energized and connects power path 180 to load terminal 135.

In the event that control circuit 170 receives concurrent signals for both function A and B, relays 120 and 125 change to the open state, resulting in connection of load terminal 135 to power path circuit 180 as the default load. This alternative arrangement is useful in applications where the function A and B signals are staged or sequentially supplied and maintained by the controller unit. As such, interface 200 is especially suited to applications involving the automation of mechanisms such as multi-speed fans, and stepped cooling and/or heating systems.

Mode selection switch 140 affects the connection of function terminals 110 and 115 to control circuit 170. When switch 140 is in the "auto" position, the automation controller unit determines the connection of power path 180 to load terminals 130 and 135 via control circuit 170 and its associated relays. When switch 140 is in the "off" position, no connection of power path circuit 180 to the load terminals is possible. When switch 140 is in the "manual" position, connection of power path circuit 180 to the load terminals is determined by the position of function selection switch 145. Switch 145 has positions for connecting the load terminals 130 or 135 to the power source input, as well as an "off" position. Switches 140 and 145 are interposed between the load terminals and the power source input, thereby allowing a user to switch between the various functions associated with each load terminal.

Figure 3:
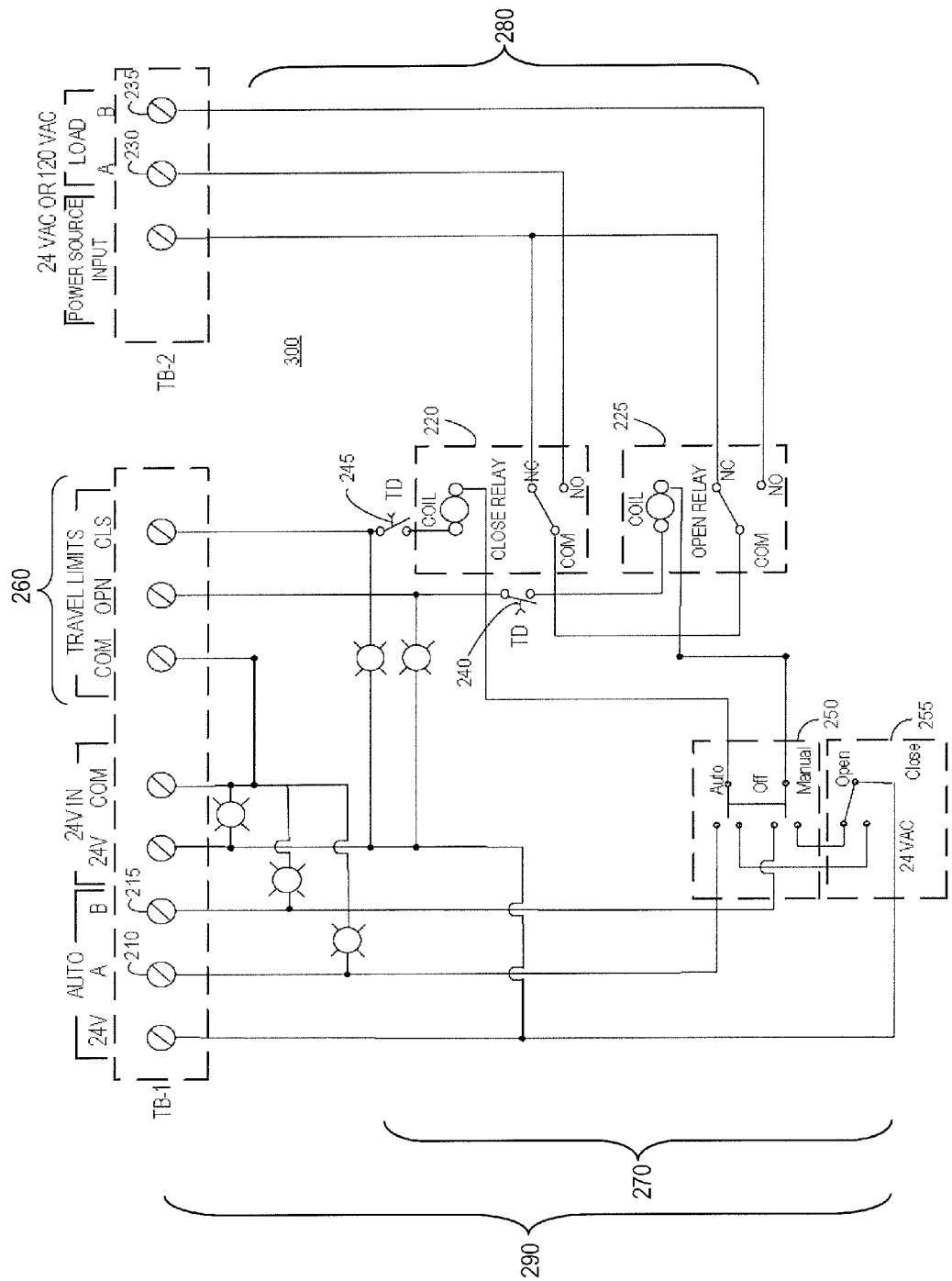
FIG. 3 is a circuit diagram of an interface in accordance with an alternative embodiment of the present invention.

FIG. 3 illustrates interconnected circuits, interface 300, interrelating an automation controller unit, a power source, and two functional loads. Power controller 290 of interface 300 comprises control circuit 270 and power path circuit 280. Control circuit 270 receives function A and B signals at function input terminals 210 and 215 from an automation controller unit (not shown) and controls power path circuit 280 by means of relays 220 and 225. Power path circuit 280 selectably connects the power source input terminal to load terminals 220 and 225.

An example of the contemplated loads in this embodiment is a bidirectional, or reversing, motor. Control circuit 270 receives signals at function input terminals 210 and 215 from an automation controller unit; for instance, function A and B signals may correspond to forward and reverse directions. Relays present in control circuit 270 are arranged such that both relays 220 and 225 have their normally closed poles connected, and are fed line voltage. The common poles of relays 220 and 225 are connected. The normally open pole of relay 220 is connected to load terminal 230 while the normally open pole of relay 225 is connected to load terminal 235.

When a function A signal is received at function input terminal 210, relay 220 is energized and connects load terminal 230 to the power path circuit 280. Likewise, when a function B signal is received at function input terminal 215, relay 225 is energized and connects load terminal 235 to power path circuit 280. In the event that interface 300 receives simultaneous function A and B signals, both relays 220 and 225 are energized, connecting load terminals 230 and 235 to each other, and resulting in neither load terminal being connected to power path circuit 280.

Time delays are self-contained components. Time Delays 240 and 245 delay the activation of relays 220 and 225, respectively, according to parameters appropriate for a given application. This feature is particularly useful when functions A and B are the forward and reverse directions of a reversing electrical motor. The time delays prevent immediate changes from one direction to the other, allowing time for the motor to wind down. This prevents damage to the motor resulting from immediate changes in direction.

Similarly, limit switches (not shown) can be connected to travel limits terminal 260, and function to limit the activation of relays 220 and 225. This is useful for defining the range of operation of the loads connected to load terminals 230 and 235, and may prevent damage resulting from exceeding the range of operation.

Mode selection switch 250 affects the controlling input for interface 300. When switch 250 is in the "auto" position, control circuit 270 is connected to the automation controller unit via the function input terminals. When switch 250 is in the "off" position, relays 220 and 225 cannot be energized. When switch 250 is in the "manual" position, relays 220 and 225 are controlled by the position of function selection switch 255.

Interface 300 is further shown as having a 24 Volt power supply terminal for the operation of the relays (when in the "manual" mode), time delays 240 and 245, and any limit switches connected to the travel limits terminal 260. In addition, the power source input is shown as either 24 Volt or 120 Volt AC power (120 Volt AC being conventional line level voltage in the United States). These voltages shown are conventional in the art, and are merely examples of possible power source configurations for the interface. It is recognized and contemplated that a variety of voltages may be used in other embodiments of the present inventive concept.

Interfaces 100, 200 and 300, as embodiments of the inventive concept, are set forth with reference to two function inputs and their associated loads; for instance, that function A and B inputs correspond to loads such as the two speeds or directions of a motor. However, it should be apparent that the function A and B loads may also represent an array of other load alternatives (e.g., function A activates a fan while function B activates a heater). Moreover, while interfaces 100, 200 and 300 are drawn to only two functions, it is intended and contemplated that embodiments of the inventive concept can be adapted to more than two functions and more than two loads by means of additional function input terminals, corresponding relay and switch circuitry, corresponding load terminals and associated power path wiring. In every embodiment, including interfaces 100, 200 and 300, the control circuit is constituted of circuitry coupling functional inputs with relays and switches, while the power path is the selectable connection, determined by the control circuit, of each load terminal to the power source input terminal.

The circuitry of interfaces 100, 200 and 300, as disclosed, may be embodied in a printed circuit board having relevant solid-state components mounted thereto. In this manner, interfaces 100, 200 and 300 can be constructed as a single integrated device that may be easily installed in a desirable manner. By combining these several components into a single integrated device, the required amount of wiring is reduced, and ease of installation is greatly improved. Because the device is compact, several units may be easily mounted in a single electrical box, which is in contrast to conventional methods that entail mounting separate components in multiple electrical boxes. The installation of multiple units in a single space also facilitates easy and simultaneous access to multiple interfaces.

Furthermore, the compact nature of the device of the present invention means that it is easily mounted in various locations for convenience, aesthetics, cost-efficient use of materials, or as otherwise desirable. For example, it may be desirable to locate the interface in close proximity to the load (e.g. a reversing motor) in order to facilitate intuitive and direct control when needed. The integrated device of the present invention can be easily mounted in such a location while occupying a minimum of space.

Information as herein shown and described in detail is fully capable of attaining the above-described object of the inventive concept, and is, thus, representative of the subject matter broadly contemplated thereby. The scope of the present inventive concept encompasses other embodiments which may become obvious to those skilled in the art, and is to be limited only by the appended claims, in which reference to an element in the singular is not intended to mean "one and only one" unless explicitly so stated, but rather "one or more."

All structural and functional equivalents to and combinations of the elements of the above-described preferred embodiment and additional embodiments that are known to those of ordinary skill in the art are hereby expressly incorporated by reference and are intended to be encompassed by the present claims. However, it should be readily apparent to those of ordinary skill in the art that various changes and modifications in component choice, form, apparatus material, and fabrication material detail may be made without departing from the spirit and scope of the invention as set forth in the appended claims.

Moreover, no requirement exists for a device or method to address each and every problem sought to be resolved by the present inventive concept, for such to be encompassed by the present claims. Furthermore, no element, component, or method step in the present disclosure is intended to be dedicated to the public regardless of whether the element, component, or method step is explicitly recited in the claims. No claim herein is to be construed under the provisions of 35

U.S.C. §112, sixth paragraph, unless the element is expressly recited using the phrase "means for."

INDUSTRIAL APPLICABILITY

The present invention is industrially applicable to automation control systems.

What is claimed:

1. An interface device for interrelating an automation controller unit, a power source, and two or more functional loads, comprising:
   a. Two or more function input terminals for receiving function signals from an automation controller unit;
   b. A control circuit for responding to said signals, coupled to said function input terminals, and having a corresponding relay coupled to each function signal input terminal;
   c. Two or more load terminals for transferring power to a load, each associated with a corresponding function input terminal;
   d. A power path circuit selectably coupled to said load terminals and controlled by said control circuit;
   e. A power source input terminal coupled to said power path circuit;
   f. A first switch coupled to the relays and interposed in said control circuit, having alternative positions for (i) connecting said function input terminals to said corresponding responsive relays, and (ii) bypassing the function input terminals; and
   g. A second switch, coupled to the first switch, interposed between the power source input terminal and the load terminals, for selecting the connection of the power path circuit to any one of the load terminals.

2. The interface device of claim 1, further comprising an additional position on either of the switches disconnecting all load terminals from the power source input terminal.

3. The interface device of claim 1, further comprising:
   a. A first switch coupled to the relays and interposed in said control circuit, having alternative positions for
      (i) connecting the function input terminals to the corresponding responsive relays, and
      (ii) bypassing the function input terminals and activating a function selection switch; and
   b. An independent power supply terminal; and
   c. A second switch coupled to the independent power supply terminal and to the first switch, interposed between the independent power supply input terminal and the relays, and having alternative positions to energize each of the relays, selecting manually the connection of the power path circuit to any one of the load terminals.

4. The interface device of claim 3, further comprising an additional position on either of the switches disconnecting all load terminals from the power source input terminal.

5. The interface device of claim 1, further comprising, an independent power supply terminal, and one or more time delay coupled to a respective relay and said independent power supply terminal for controlling the timing of each relay being energized.

6. The interface device of claim 1, further comprising an independent power supply terminal and one or more limit switch terminals coupled to a respective relay and the independent power supply terminal for the optional connection of limit switches to the control circuit.

7. An interface device for interrelating an automation controller unit, a power source, and two or more functional loads, comprising:
   a. A first function input terminal for receiving a first signal and a second function input terminal for receiving a second signal;
   b. A first load terminal associated with the first signal and a second load terminal associated with the second signal;
   c. A single power source input terminal;
   d. A first relay, coupled with the first function input terminal, having a normally closed pole, a normally open pole coupled with the first load terminal, and a common pole;
   e. A second relay, coupled with the second function input terminal, having a normally closed pole coupled with the first relay's normally closed pole, a normally open pole coupled with the second load terminal, and a common pole coupled with the first relay's common pole;
   f. A first switch, coupled with the power source input terminal, having an automatic position coupled with the first and second relays normally closed poles, a manual position, and an off position disconnecting all load terminals from the power source input terminal; and,
   g. A second switch, coupled with the manual position of the first switch, having a first position coupled with the first relay's normally open pole and the first load terminal, and a second position coupled with the second relay's normally open pole and the second load terminal.

8. An interface device for interrelating an automation controller unit, a power source, and two or more functional loads, comprising:
   a. A first function input terminal for receiving a first signal and a second function input terminal, for receiving a second signal;
   b. A first load terminal associated with the first signal and a second load terminal associated with the second signal;
   c. A single power source input terminal;
   d. A first relay, coupled with the first function input terminal, having a normally closed pole, a normally open pole coupled with the first load terminal, and a common pole;
   e. A second relay, coupled with the second function input terminal, having a normally closed pole coupled with the first relay's common pole, a normally open pole coupled with the second load terminal, and a common pole;
   f. A first switch, coupled with the power source input terminal, having an automatic position coupled with the second relay's common pole, a manual position, and an off position disconnecting all load terminals from the power source input terminal; and
   g. A second switch, coupled with the first switch's manual position, having a first position coupled with the first relay's normally open pole and the first load terminal, a second position coupled with the second relay's normally open pole and the second load terminal, and an off position disconnecting all load terminals from the power source terminal.

9. An interface device for interrelating an automation controller unit, a power source, and two or more functional loads, comprising:
   a. A terminal block having a plurality of terminals, including, a power source input terminal, an independent power source terminal, a first function input terminal for receiving a first signal, a second function input terminal for receiving a second signal, and a first and second load terminal;
   b. A first relay, coupled with a limit switch terminal, having a normally closed pole coupled with the power source input terminal, a normally open pole coupled with the first load terminal, and a common pole;
   c. A second relay, coupled with a limit switch terminal, having a normally closed pole coupled with the power source input terminal, a normally open pole coupled with the second load terminal, and a common pole coupled with the first relay's common pole;

d. A double pole switch having an automatic position coupling the first function input terminal with the first relay at said switch's first pole and the second function input terminal with the second relay at the switch's second pole, a manual position coupled with the first relay at its first pole and the second relay at its second pole, and an off position disconnecting all load terminals from the power source input terminal; and e. A second switch, coupled with the independent power source terminal, having an open position coupled with the first pole of the first switch's manual position and a closed position coupled with the second pole of the first switch's manual position.

10. The interface device of claim 9, further comprising time delay devices interposed between the relays and the independent power source terminal.

11. The interface device of claim 9, further comprising limit switch terminals coupled with the relays.

* * * * *